March 10, 1959

A. J. HILGERT 2,876,786

CONTROL APPARATUS

Filed Dec. 24, 1954

INVENTOR.
Adolph J. Hilgert
BY
Seegert & Schwalbach
Attys

March 10, 1959     A. J. HILGERT     2,876,786
CONTROL APPARATUS

Filed Dec. 24, 1954     2 Sheets-Sheet 2

INVENTOR.
Adolph J. Hilgert
BY Seegert & Schwalbach
Attys

United States Patent Office 2,876,786
Patented Mar. 10, 1959

2,876,786

CONTROL APPARATUS

Adolph J. Hilgert, Milwaukee, Wis., assignor to Baso Inc., Milwaukee, Wis., a corporation of Wisconsin Application December 24, 1954, Serial No. 477,538

23 Claims. (Cl. 137—66)

This invention relates to improvements in control apparatus operable on the power available from a source of small electric energy, for example a thermoelectric generator.

Because of the limited amount of power available from a thermoelectric generator, utilization of thermoelectric current for powering control apparatus has generally been limited to apparatus wherein a control member is held in a given position by a thermoelectrically energized magnet after said control member has been manually reset to said position, said magnet having insufficient attractive force to actuate the control member to said position. In another form of control device powered thermoelectrically, the thermoelectric current energizes a small relay for controlling bleed ports in a diaphragm valve structure, actual movement of the valve member being accomplished by fuel pressure acting on a diaphragm.

It is a principal object of the present invention to provide improved control apparatus having an improved power unit comprising a motor operable on the current from a source of small electric energy, for example a thermoelectric generator, said motor utilizing said current in a manner to integrate the work available from said current to thereby make possible performance of controlling operations heretofore incapable of performance by control devices similarly energized.

Another object of the invention is to provide an improved control device of the aforementioned character wherein the motor thereof comprises a step by step electromagnetic mechanism, there being energy storing means in which energy is stored by operation of said motor for release to perform a controlling operation when a predetermined amount of energy has been stored in said energy storing means.

A further object of the invention is to provide an improved control device of the character described wherein the step by step electromagnetic mechanism is enclosed within an hermetically sealed casing and comprises low resistance contacts providing self-interruption of the energizing current therefor, the entire electrical circuit for said control device being of low resistance.

A more specific object of the invention is to provide an improved control device of the class described which is provided with snap acting means performing the dual function of defining the minimum amount of energy storage required to effect a controlling operation, and also defining the limits of the controlling movement.

Another object of the invention is to provide an improved control device of the character described provided with novel lever mechanism affording a force transmitting connection between the motor and the energy storing means, said lever mechanism affording a leverage which varies in accordance with the amount of energy stored in the energy storing means.

Still another object of the invention is to provide an improved control device of the aforementioned character wherein there is a ratchet wheel and cooperating ratchet pawl means for actuating said wheel in one direction and preventing rotation thereof in the opposite direction as long as the motor is energized, there being means responsive to deenergization of said motor for effecting release of said ratchet wheel by said pawl means for return of said ratchet wheel to its initial position.

Another object of the invention is to provide an improved control device of the character described wherein the motor has an operative connection with a fluid pump which is fluidly connected with an hydraulic accumulator, operation of said motor causing hydraulic fluid under pressure to be pumped into said hydraulic accumulator to effect a controlling operation, there being a relief valve actuable on deenergization of said motor for releasing the fluid pressure in the hydraulic accumulator.

Another object of the invention is to provide an improved control device of the class described which is characterized by its compactness and simplicity of construction, its economy in manufacture, and its operating efficiency.

Other objects and advantages of the invention will appear as the description proceeds, reference being had to the accompanying drawings illustrating two forms of the invention and in which like characters of reference indicate the same parts in all of the views. In the drawings.

Figure 1:
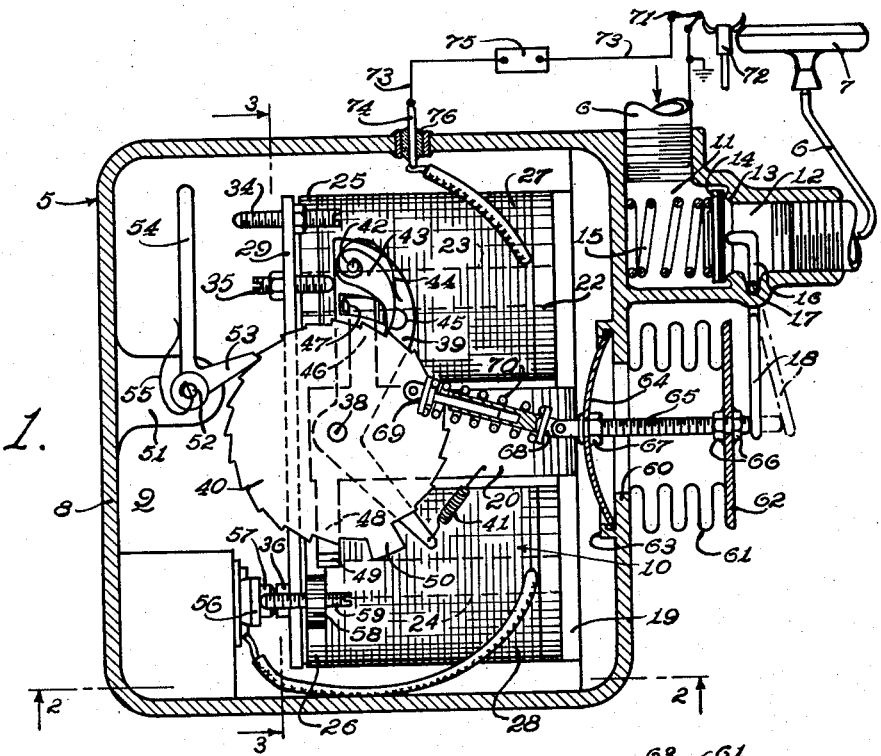
Figure 1 is a sectional plan view of one form of the improved control apparatus.

Referring more particularly to Figure 1 of the drawing, the embodiment of the invention selected for illustration takes the form of control apparatus comprising an electromagnetic fuel control device indicated generally by the numeral 5. The device 5 comprises a body or casing 8 having a hermetically sealed chamber 9 for accommodation of an electromagnetic power unit or motor 10, said body also being provided with valve body portion having a fuel inlet chamber 11, a fuel outlet chamber 12 and an annular valve seat 13 interposed between said fuel chambers. The control member of the illustrated device takes the form of a valve member 14 which coacts with the seat 13 and is biased thereagainst by a coil spring 15 as shown. The valve member 14 is carried by an arm 16 which is fixed to a rotatable shaft 17 which projects externally of the casing 8 through a suitable fluid tight seal. A control arm 18 is fixed to the shaft 17 externally of the casing 8 and is operatively connected for actuation by the motor 10 in a manner to be hereinafter described.

Figure 2:
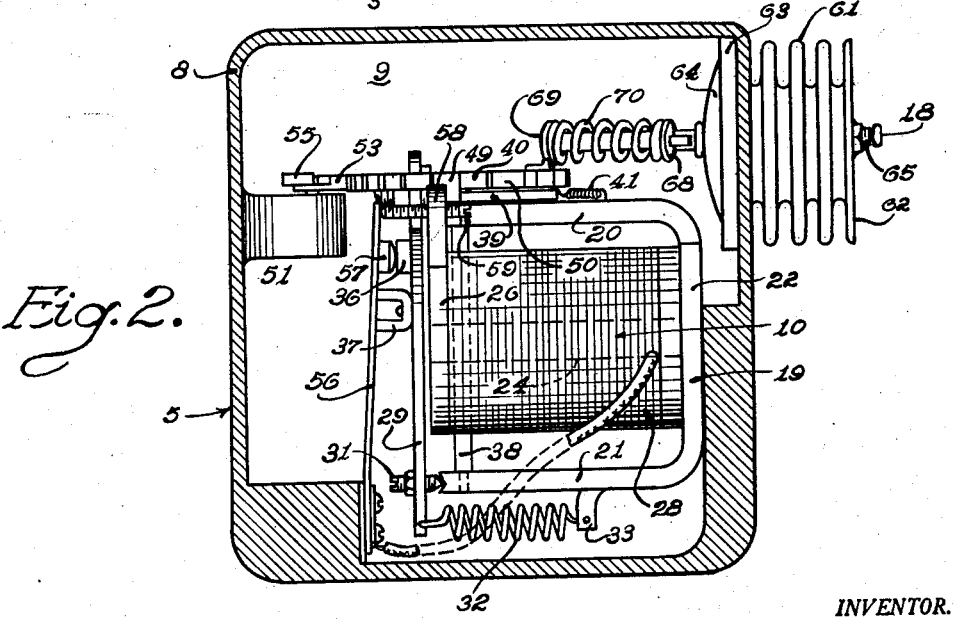
Figure 2 is a vertical sectional view taken approximately along the line 2—2 of Figure 1.
Figure 3:
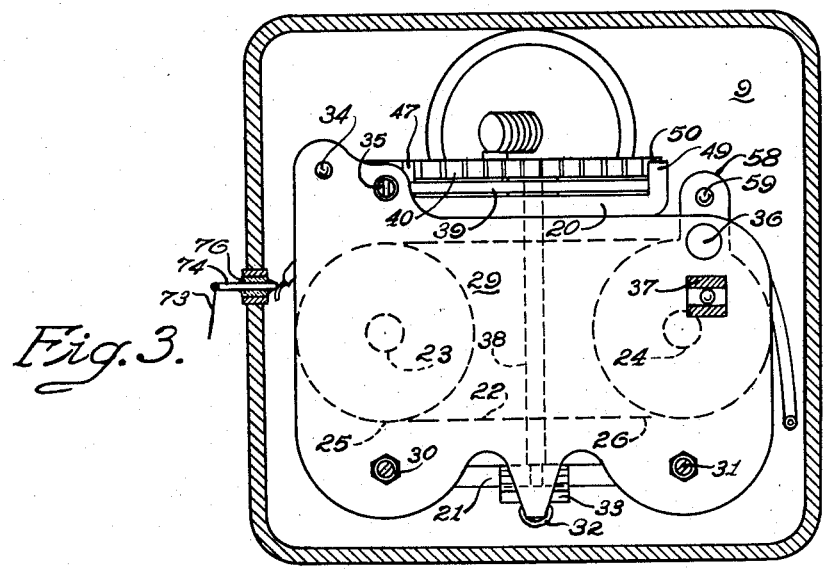
Figure 3 is a vertical sectional view taken approximately along the line 3—3 of Figure 1.

The motor 10 comprises a step by step electromagnetic mechanism and has a frame member 19 which is generally U-shaped in side view as shown most clearly in Figure 2. The frame member 19 has spaced parallel arms 20 and 21, and has an intermediate portion which affords a support for a U-shaped magnetically permeable electromagnet core comprising a base plate 22 and a pair of spaced parallel core legs 23 and 24 shown in dotted lines in Figures 1 to 3. The core legs 23 and 24 carry enlarged magnetically permeable pole face members or pole pieces 25 and 26, respectively, and between said pole face members and the base plate 22, said core legs have energizing coils 27 and 28 wound thereon as shown, said coils being connected in series circuit relation, aiding each other in the generation of magnetic flux. An armature 29, the shape of which is best shown in Figure 3, is pivotally mounted, as by pivot screws 30 and 31 seated in suitable end recesses in the lower arm 21 of the frame member 19 as shown in Figure 2. A coiled spring 32 is anchored at one end to the armature and at the other end to a lug 33 depending from the lower frame arm 21 as shown, said spring biasing the armature 29 away from the pole pieces 25 and 26. The armature 29 carries oppositely directed set screws 34 and 35, a low resistance electrical contact member 36 and a U-shaped permanent magnet 37, the purpose of each of which will appear hereinafter.

A shaft 38 extends between and is anchored to the arms 20 and 21 of the frame 19, said shaft extending through and projecting beyond the arm 20. Pivotally mounted on the projecting end of the shaft 38 is an irregularly shaped bell crank lever 39, and outwardly of said lever a ratchet wheel or intermediate member 40 is rotatably mounted on said shaft. Referring to Figure 1, a tension spring 41 is anchored at one end to one arm of the lever 39 and at the other end to the upper arm 20 of the frame 19. The spring 41 biases the lever 39 in a counterclockwise direction into engagement with the set screw 35 carried by the armature 29. The lever 39 carries a pin 42 fixed thereto, and pivotally mounted on said pin is a pawl 43 which is biased into engagement with the stepped periphery of the ratchet wheel 40 by means of a spring 44 anchored at one end to the pin 42. The lever 39 is formed with an arcuate slot 45, and the upper arm 20 of the frame 19 is provided with a transverse arm 46 formed with lug 47 projecting through the slot 45 to limit the movement of the lever 39 in a clockwise direction by coaction with the closed end of said slot. The lug 47 also projects into the path of the pawl 43 for a purpose which will later appear. The upper arm 20 of the frame 19 is also provided with an oppositely directed transverse arm 48 having a lug 49 positioned for coaction with a lug 50 on the periphery of the ratchet wheel 40 to limit the clockwise rotation of said wheel.

The casing 8 is formed with an inwardly directed boss 51 on which a fixed pivot pin 52 is mounted, said pin having pivotally mounted thereon a pawl member 53 having an elongated tripping arm 54. The pawl 53 is biased into engagement with the stepped periphery of the ratchet wheel 40 by a spring 55 anchored at one end to the fixed pin 52 as shown in Figure 1. The tripping arm 54 is positioned for engagement by the armature set screw 34 and is pivoted thereby whenever the armature 29 moves to its full retracted position. Such pivoting of the tripping arm 54 disengages the pawl 53 from the ratchet wheel 40.

Insulatably mounted on the interior of the casing 8 is a resilient, magnetically permeable contact arm 56 which carries electric contact member 57, said contact member, like the contact member 36, being of low resistance metal, for example silver or gold. The contact 57 is positioned for engagement with the contact 36, and the permanent magnet 37 is positioned for coaction with the resilient contact arm 56 in a manner to be hereinafter described. The pole piece 26 of the electromagnet is provided with an outstanding lug 58 which carries a set screw 59 for coaction with the upper end of the resilient contact arm 56 as will hereinafter appear.

To provide a snap-acting, energy storing force transmitting connection between the ratchet wheel 40 and the control arm 18, the following means is provided. The casing 8 is formed with an opening 60 in a side wall thereof, and sealed to the margin of the opening 60 is a bellows or other suitable enclosure 61 having a movable wall 62. The casing 8 is also formed with inwardly directed annular shoulder means 63 for retaining a snap disc 64 which extends across the opening 60 as shown. A bolt 65 is fixed to the end wall 62 of the bellows, as by nuts 66 having sealing engagement therewith, and a nut 67 on the bolt 65 bears against the outer surface of the snap disc 64 as shown, there being shoulder means on the bolt 65 for engagement with the inner surface of said disc. The outer end of the bolt 65 is positioned for abutment with the control arm 18 as shown, and the inner end of said bolt is pivotally connected to an abutment member 68 telescopically associated with an abutment member 69, said abutment members being surrounded by, and abutting endwise with, a coiled energy storing spring 70. The abutment member 69 is pivotally connected to the ratchet wheel 40 as shown.

The improved control apparatus is adapted for operation on electrical energy from a source of small electric power, for example a thermoelectric generator. Figure 1 illustrates an electrical circuit comprising a thermoelectric generator, for example a single thermocouple 71, subject to the heat of a pilot burner 72 positioned for coaction with said pilot burner and with the main burner 7. One terminal of the generator 71 is grounded to the casing 8 in the usual manner, and the other terminal of said generator is connected to a terminal 74 by means of a conductor 73 which may have interposed therein a low resistance thermostat 75, said thermostat preferably having enclosed low resistance metal contacts, for example contacts made of silver or gold. The terminal 74 extends through a glass type hermetic seal 76 and is connected in circuit with one end of the coil 27, the other end of said coil being connected in circuit with one end of the coil 28. The other end of the coil 28 is connected in circuit with the resilient contact arm 56 as shown in Figures 1 and 2. To complete the thermoelectric circuit, the contact member 36 is grounded to the casing 8 through the armature 29 and frame member 19.

Operation

When the electromagnet of the power unit 10 is deenergized, the armature 29 drops out, under the bias of the spring 32, to fully retracted position wherein the screw 34 engages the tripping arm 54 and thereby disengages the pawl 53 from the ratchet wheel 40. During this retractile movement, and prior to engagement of the screw 34 with the arm 54, the contact 36 engages the contact 57 and the magnet 37 magnetically engages the resilient arm 56 to effect latching of the engaged contacts. During the aforementioned retraction of the armature 29, the spring 41 rotates the lever 39 in a counterclockwise direction, so that said lever follows the armature screw 35. As the armature 29 approaches its fully retracted position, the pawl 43, moving with the lever 39, engages the lug 47 and further counterclockwise movement of the lever 39 causes pivoting of said pawl out of engagement with the periphery of the ratchet wheel 40. When the ratchet wheel 40 is thus disengaged from the pawls 53 and 43, the said wheel rotates in a counterclockwise direction to unload the energy storing spring 70.

When the thermostat 75 calls for heat and the generator 71 is heated by the flame of the pilot burner 72, thermoelectric current flows in the electrical circuit shown in Figure 1 through the conductor 73, the contacts of the thermostat 75, terminal 74, coils 27 and 28, resilient arm 56, contacts 57 and 36, the armature 29, frame 19 and back to the generator via the ground circuit comprising the casing 8. When the electromagnet afforded by the coils 27 and 28, the core legs 23 and 24, and the base plate 22 is thus energized, the armature is attracted toward the pole pieces 25 and 26 and moves toward said pole pieces against the bias of the spring 32. As the armature so moves, the armature screw 35 simultaneously rotates the lever 39 in a clockwise direction, thus causing the pawl 43 to reengage the stepped periphery of the ratchet wheel 40 and rotate the latter with said lever.

During the attractive movement of the armature, the permanent magnet 37 holds the contacts 57 and 36 in engagement and thereby flexes the resilient contact arm 56 as shown in Figure 2. Before the armature 29 engages the pole pieces 25 and 26, however, the outer end of the contact arm 56 engages the set screw 59, and further inward movement of the armature after said engagement pulls the contact 36 and the magnet 37 away from the contact 57 and the resilient arm 56 respectively. The contact arm 56 is thus permitted to return to its retracted unflexed position. At the same time disengagement of the contacts 36 and 57 interrupts the flow of energizing current and deenergizes the electromagnet. The armature 29 thereupon begins retractive movement under the bias of the springs 32 and 41, and the lever 39 moves counterclockwise with such retractive movement as before. The ratchet wheel 40 does not move in the reverse direction with the lever 39, however, because such movement is prevented by the pawl 53 which is biased into engagement with said ratchet wheel by the spring 55. Thus, as the lever 39 moves counterclockwise during retraction of the armature, the pawl 43 moves into engagement with the next peripheral step of the ratchet wheel 40. Before the armature has been retracted sufficiently for the armature screw 34 to engage the pawl arm 54, the contact 36 reengages the contact 57 to reenergize the electromagnet, and the permanent magnet 37 simultaneously magnetically engages the contact arm 56 to effect latching of the contacts 36 and 57. On reenergization of the electromagnet, the armature is again attracted to the pole pieces 25 and 26 to start another stepping cycle. Thus, continuous step by step rotation of the ratchet wheel 40 is effected by continuous energization of the electromagnet by current from the thermoelectric generator.

As the ratchet wheel 40 is thus rotated in a step by step manner, the abutment member 69 is moved therewith to effect compression and storage of energy in the spring 70, said abutment member moving telescopically with respect to the mating abutment member 68 during compression of said spring. It will be noted that by virtue of the illustrated arrangement of the parts utilizing the well known toggle-link principle, the leverage afforded by the mechanism varies in accordance with amount of clockwise rotation of the wheel 40 from its initial position and therefore in accordance with the amount of energy stored in the spring 70 during the energy storing action. Thus, a given value of attractive force is available at the armature 29 for each step, and this force exerts a corresponding given rotative force on the wheel 40 for each step, but because of the toggle arrangement, progressively increasing forces are exerted by the abutment member 69 on the energy storing spring 70 during each step of the clockwise rotation of the ratchet wheel 40. This arrangement makes it possible to store relatively large amounts of energy in the spring 70.

As the lug 50 on the ratchet wheel 40 approaches the stop lug 49 during step-by-step rotation of said ratchet wheel, the energy stored in the spring 70 plus the attractive force on the armature 29, overcomes the resistance of the snap disc 64 and of the valve biasing spring 15, and said disc snaps to an outwardly convexed conformation, moving the screw 65 and bellows wall 62 outwardly and swinging the control arm 18 outwardly to the dot and dash line position shown. This, of course, causes corresponding valve opening pivotal movement of valve arm 16 and valve member 14, and permits fuel flow to the main burner 7. As the snap disc 64 snaps in the manner described, energy is released from the spring 70 and the step-by-step operation of the motor 10 continues until the stop lug 50 engages the stop lug 49 to stall the motor. The snap disc 64 is held in the outwardly convexed position and thereby the valve member 14 is held open as long as the motor 10 is energized. When the lugs 49 and 50 are in engagement, the axis of the pivotal connection of the abutment member 69 with the ratchet wheel 40 remains offset from a line connecting the center of the shaft 38 with the axis of the pivotal connection of the abutment member 68 with the screw 65. Thus, the spring 70 reacts against the ratchet wheel 40 to bias the latter in a counterclockwise direction against the pawls 43 and 53 when the lugs 49 and 50 are in engagement.

On opening of the contacts of the thermostat 75 or upon extinguishment of the flame of the pilot burner 72 and resultant cooling of the generator 71, the electromagnet is deenergized and the armature 29 drops out to its fully retracted position, thereby causing the screw 34 to engage the tripping arm 54 and release the pawl 53, while at the same time permitting counterclockwise rotation of the lever 39 and release of the pawl 43 by its engagement with the lug 47. With the pawls 43 and 53 released, the ratchet wheel 40 is free to rotate in a counterclockwise direction under the bias of the springs 70 and 15 and the inherent tendency of the snap disc 64 and bellows 61 to return to their normal states. Thus, as the ratchet wheel 40 is released, snap disc 64 snaps inwardly to its position shown in Figure 1, and the valve member 14 returns to the seat 13 shutting off all fuel flow to the main burner 7.

Figure 4:
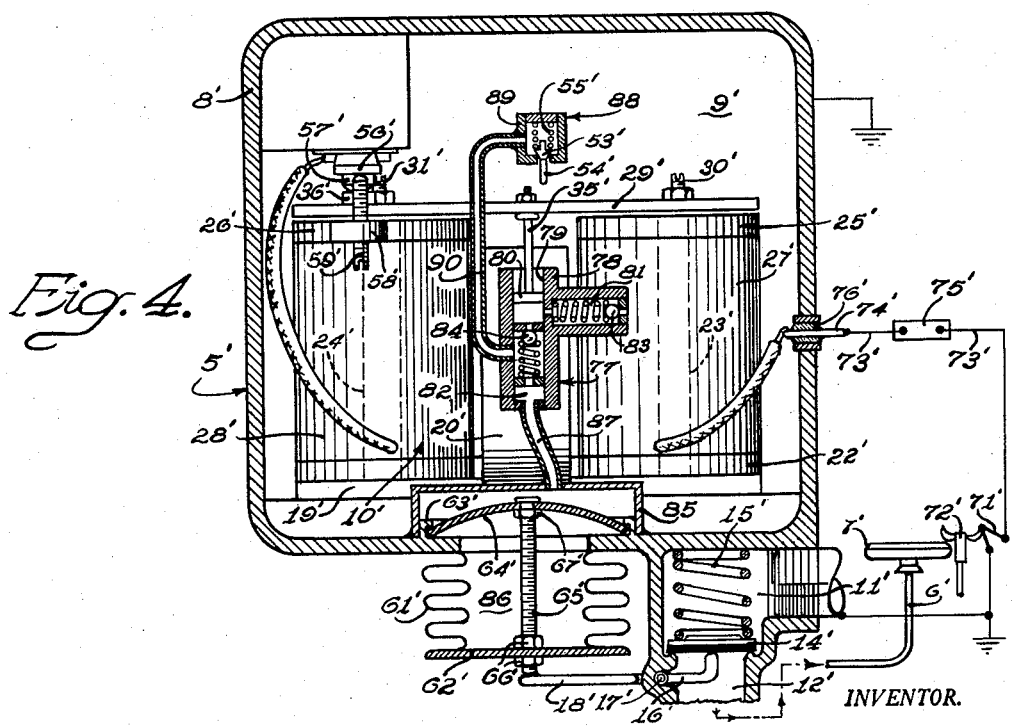
Figure 4 is a view corresponding generally to Figure 1 and illustrating another form of the invention.

Figure 4 illustrates another form of the invention wherein the electromagnetic step-by-step mechanism may be substantially identical with that shown in Figures 1 to 3. Except as noted hereinafter, the parts indicated by primed numerals in Figure 4 correspond to the parts in Figures 1 to 3 indicated by the same numerals unprimed. In Figure 4, the casing 8' affords a sealed chamber as does the casing 8 of Figures 1 to 3. Mounted on the frame arm 20' is a piston type fluid pump 77 having a body 78 provided with a bore 79 in which a piston 80 is reciprocatable. The body 78 is provided with an inlet chamber 81 having an inlet check valve 83 therein, and said body is also provided with an outlet chamber 82 having an outlet check valve 84 therein. The piston 80 is connected to the armature 29' by means of a rod 35' as shown. A generally cup-shaped cover member 85 is positioned over the shoulder means 63' and snap disc 64', and said cover is sealed to the adjacent wall portion of the casing 8' to form with the bellows 61' an hydraulic accumulator having a fluid tight chamber 86. The outlet chamber 82 of the pump 77 is fluidly connected with the chamber 86 by means of a conduit 87 as shown. A relief valve assembly 88 having a valve body 89 is suitably mounted on the same side of the armature 29' as the contact leaf 56', said valve body being provided with an apertured wall portion affording a seat for a relief valve member 53' biased toward said seat by a compression spring 55'. The valve member 53' is provided with a tripping stem 54' which is positioned for actuation by the armature 29' to open the valve member 53' when the armature moves to fully retracted position. A conduit 90 affords fluid communication between the interior of the relief valve body 89 and the outlet chamber 82 of the pump 77.

The casing 8' contains an hydraulic fluid so that on energization of the coils 27' and 28' of the electromagnet by thermoelectric current from the generator 71', the resultant oscillatory movement of the armature 29' causes reciprocation of the pump piston 80 and pumping of hydraulic fluid from the chamber 9' into the chamber 86. Because of the relatively small diameter of the piston 80 as compared with the area of the bellows end wall 62', a limited amount of force available at the armature 29' can produce a much greater force at the wall 62' for actuation of the arm 18' and valve member 14'. As the fluid is pumped into the chamber 86, the bellows 61' tends to expand and move the wall 62' outwardly. This expansion is resisted by the snap disc 64' and spring 15'. However, when the pressure within the chamber 86 overcomes these resisting forces, the snap disc 64' snaps to an outwardly convexed condition, and the control arm 18' is swung outwardly to unseat the valve member 14'. As the snap disc 64' snaps in the manner described, the armature 29' continues to oscillate until the fluid pressure built up within the chamber 86 stalls the motor 10', and this fluid pressure holds the valve member 14' open.

On deenergization of the electromagnet coils 27' and 28', as a result, for example, of opening of the contacts of the thermostat 75, the armature 29' drops out to its fully retracted position, and in so doing engages the tripping stem 54', pushing the valve member 53' off its seat to relieve the fluid pressure in the chamber 86 of the hydraulic accumulator. When this occurs, the spring 15' returns the valve member 14' to its seat and the snap disc 64' returns to its normally inwardly convexed position shown. While the snap action afforded by a snap disc is desirable in most applications, the snap disc may be omitted in applications wherein it is desirable to produce gradual movement of a control member by operation of the motor.

From the foregoing it is apparent that in the improved control apparatus, the thermoelectric motors integrate the power available from a thermoelectric generator or other small electric source in a manner to provide a controlling action unattainable by thermoelectrically powered control apparatus heretofore available. The illustrated thermoelectric motors are of the type which, having performed the desired controlling function continue to operate until stalled, and when stalled, hold the control member in actuated position, said control member being released for return to its unactuated position on deenergization of its motor.

Having thus described two specific embodiments of the invention, it is to be understood that these forms have been selected to facilitate the disclosure of the invention, rather than to limit the number of forms which the invention may assume. Various modifications, adaptations and alterations may be applied to the specific forms shown to meet the requirements of practice, without in any manner departing from the spirit or scope of the present invention, and all of such modifications, adaptations, and alterations are contemplated as may come within the scope of the appended claims.

What is claimed as the invention is:

1. Control apparatus comprising, a control member movable to controlling positions, a step by step electromagnetic operator, a source of electric energy connected in circuit with said operator for energizing the latter, said operator having an armature oscillatable between a retracted position and an attracted position on energization of said operator, and an operative connection between said armature and control member comprising energy storing means in which energy is stored by oscillatory movement of said armature for use in actuating said control member when a predetermined amount of energy has been stored therein.

2. Control apparatus comprising, a control member movable to controlling positions, a step by step electromagnetic operator, a source of electric energy connected in circuit with said operator for energizing the latter, said operator having an armature oscillatable between a retracted position and an attracted position on energization of said operator, and an operative connection between said armature and control member comprising snap-acting energy storing means in which energy is stored by oscillatory movement of said armature for use in actuating said control member when a predetermined amount of energy has been stored therein.

3. A power unit comprising an electroresponsive operator having an actuating member movable by energization of said operator, means for storing energy for release to do work after a predetermined amount of energy is stored, and a force transmitting connection between said actuating member and said energy storing means for effecting storage of energy in the latter by movement of said actuating member, said connection comprising a lever mechanism in which the leverage afforded varies in accordance with the amount of energy stored.

4. Control apparatus comprising, a control member movable to controlling positions, a step by step electromagnetic operator, a source of electric energy connected in circuit with said operator for energizing the latter, said operator having an armature oscillatable between a retracted position and an attracted position on energization of said operator, an operative connection between said armature and control member comprising energy storing means in which energy is stored for use in actuating said control member when a predetermined amount of energy has been stored therein, and a force transmitting connection between said armature and energy storing means for effecting storage of energy in said energy storing means by oscillatory movement of said armature, said connection comprising a lever mechanism in which the leverage afforded thereby varies in accordance with the amount of energy stored.

5. Control apparatus as claimed in claim 1 wherein the operative connection between the armature and control member also comprises a fluid pump actuated by oscillatory movement of said armature, and the energy storing means comprises an hydraulic accumulator fluidly connected with said pump and into which hydraulic fluid is pumped by said pump in response to said oscilatory armature movement.

6. Control apparatus as claimed in claim 1 wherein the operative connection between the armature and control member also comprises a fluid pump actuated by oscillatory movement of said armature, and the energy storing means comprises an hydraulic accumulator fluidly connected with said pump and into which hydraulic fluid is pumped by said pump in response to said oscilatory armature movement, said accumulator being connected to said control member to effect controlling movement of the latter when a predetermined amount of fluid has been pumped into said accumulator.

7. Control apparatus as claimed in claim 1 wherein the operative connection between the armature and control member also comprises a fluid pump actuated by oscillatory movement of said armature, and the energy storing means comprises an hydraulic accumulator fluidly connected with said pump and into which hydraulic fluid under pressure is pumped by said pump in response to said oscillatory armature movement, said accumulator being connected to said control member to effect controlling movement of the latter when a predetermined fluid pressure has been built up in said accumulator.

8. Control apparatus as claimed in claim 1 wherein the armature is movable to a second retracted position on deenergization of the electromagnet, the operative connection between the armature and control member comprises a fluid pump having a driving connection with said armature, and the energy storing means comprises an hydraulic accumulator fluidly connected with said pump and into which hydraulic fluid is pumped by said pump in response to said oscillatory armature movement, said control apparatus being further characterized by a relief valve fluidly connected to said accumulator and positioned for actuation by movement of said armature to said second retracted position to thereby effect release of fluid from said accumulator in response to deenergization of said electromagnet.

9. Control apparatus as claimed in claim 1 wherein the energy storing means comprises an hydraulic accumulator, and the operative connection between the armature and the control member also comprises a fluid pump fluidly connected to said hydraulic accumulator and actuated by oscillatory movement of said armature, and means imparting snap-action to the controlling movement of said control member.

10. Control apparatus comprising, a control member movable to controlling positions, a step by step electromagnetic operator, a thermoelectric generator connected in circuit with said operator for energizing the latter, said operator having an armature oscillatable between a first retracted position and an attracted position on energization of said operator, a movable intermediate member operatively connected to said control member and biased in one direction, ratchet means operatively associated with said armature and intermediate member for actuating said intermediate member in a direction for effecting controlling movement of said control member by oscillatory movement of said armature, said ratchet means retaining said intermediate member in an actuated position when moved thereto, said armature being movable to a second retracted position on deenergization of said operator, and release means operatively associated with said armature and ratchet means and responsive to movement of said armature to said second retracted position for effecting release of said intermediate member from said ratchet means and return movement thereof under its bias.

11. Fuel control apparatus comprising, a fuel control valve member biased toward closed position, a step by step electromagnetic operator for said valve, a thermoelectric generator subject to the heat of burning fuel and connected in circuit with said operator for energizing the latter, said operator having an armature which when energized is oscillatable between attracted position and a first retracted position, an intermediate member operatively connected to said valve member and biased in one direction, ratchet means for actuating said intermediate member in a valve opening direction against said bias by oscillatory movement of said armature, said ratchet means retaining said intermediate member in actuated position when moved thereto, said armature being movable to a second retracted position on failure of said generator, and release means operatively associated with said armature and ratchet means and responsive to movement of said armature to said second retracted position for effecting release of said intermediate member from said ratchet means and return movement thereof under said bias and thereby effecting closure of said fuel control valve to provide safe failure of the apparatus.

12. Control apparatus comprising, a control member movable to controlling positions, a step by step electromagnetic operator, a thermoelectric generator subject to the heat of burning fuel and connected in circuit with said operator for energizing the latter, said operator having an armature oscillatable between a first retracted position and an attracted position on energization of said operator, a movable intermediate member, energy storing means operatively connected to said intermediate and control members, ratchet means operatively associated with said armature and intermediate member for actuating the latter in a direction for effecting storage of energy in said energy storing means by oscillatory movement of said armature, said ratchet means retaining said intermediate member in an actuated position when moved thereto, and said energy storing means effecting controlling movement of said control member when a predetermined amount of energy is stored therein, said armature being movable to a second retracted position on deenergization of said operator, and release means operatively associated with said armature and ratchet means and responsive to movement of said armature to said second retracted position for effecting release of said intermediate member from said ratchet means, thereby effecting return movement of said intermediate member and release of the energy stored in said energy storing means by said intermediate member.

13. Control apparatus comprising, a control member movable to controlling positions, a step by step electromagnetic operator, a thermoelectric generator subject to the heat of burning fuel and connected in circuit with said operator for energizing the latter, said operator having an armature oscillatable between a first retracted position and an attracted position on energization of said operator, a movable intermediate member, energy storing means including snap-acting means operatively connected to said intermediate and control members, ratchet means operatively associated with said armature and intermediate member for actuating the latter in a direction for effecting storage of energy in said energy storing means by oscillatory movement of said armature, said ratchet means retaining said intermediate member in an actuated position when moved thereto, and said energy storing means effecting snap-acting controlling movement of said control member when a predetermined amount of energy is stored therein, said armature being movable to a second retracted position on deenergization of said operator, and release means operatively associated with said armature and ratchet means and responsive to movement of said armature to said second retracted position for effecting release of said intermediate member from said ratchet means, thereby effecting return movement of said intermediate member and release of the energy stored in said energy storing means by said intermediate member.

14. An electromagnetic operator comprising, in combination, an electromagnet connected in circuit with a source of small electric energy, an armature coacting with said electromagnet biased toward a retracted position and movable by energization of said electromagnet toward an attracted position, a pair of coacting low resistance contacts in said circuit controlling energization of said electromagnet by current from said source, the first of said contacts being movable with said armature, and the second of said contacts being biased toward a first position and movable toward a second position, the second contact being so disposed that said first contact is engageable with said second contact at the latter's first position by retractile movement of said armature and before said armature reaches its retracted position, said engagement completing said circuit and effecting energization of said electromagnet, means latching the engaged contacts together for movement with said armature during attractive movement of the latter, means disengaging said latched contacts when said second contact reaches its said second position, thereby releasing said second contact for return movement toward its first position under its bias, said contact disengagement also interrupting said circuit to deenergize said electromagnet and effect retractile movement of said armature under its bias, a work performing member engaged for movement with said armature, failure of said source effecting deenergization of said electromagnet and retractile movement of said armature to its retracted position, and a movable member operatively coacting with said armature and movable from a first position to a second position by movement of said armature to its said retracted position.

15. An electromagnetic operator comprising, in combination, an electromagnet connected in circuit with a source of small electric energy, an armature coacting with said electromagnet biased toward a retracted position and movable by energization of said electromagnet toward an attracted position, a pair of coacting low resistance contacts in said circuit controlling energization of said electromagnet by current from said source, the first of said contacts being movable with said armature, and the second of said contacts being biased toward a first position and movable toward a second position, the second contact being so disposed that said first contact is engageable with said second contact at the latter's first position by retractile movement of said armature and before said armature reaches its retracted position, said engagement completing said circuit and effecting energization of said electromagnet, means latching the engaged contacts together for movement with said armature during attractive movement of the latter, means disengaging said latched contacts when said second contact reaches its said second position, thereby releasing said second contact for return movement toward its first position under its bias, said contact disengagement also interrupting said circuit to deenergize said electromagnet and effect retractile movement of said armature under its bias, failure of said source effecting deenergization of said electromagnet and retractile movement of said armature to its retracted position, an actuated member operatively related to said armature biased toward a first position and movable toward a second position by movement of said armature, means for retaining said actuated member in an actuated position when moved thereto against said bias, and a tripping member operatively coacting with said armature and retaining means for releasing said actuated member from said retaining means for return movement toward said first position under said bias on movement of said armature to retracted position.

16. Control apparatus comprising, a control member having a first position and movable toward an actuated position, a thermoelectric generator, a motor in circuit with said generator capable of continuous operation on the power supplied by said generator when subjected to less than a predetermined load, said motor being adapted to stall when subjected to a load greater than said predetermined load, and force transmitting connection means between said motor and control member operable to effect actuation of said control member to said actuated position by operation of said motor under less than said predetermined load and to impose more than said predetermined load on said motor to stall the latter when said control member is in said actuated position, said motor on continued energization being operable to hold said control member in said actuated position, and on deenergization permitting return of said control member to its first position.

17. Control apparatus comprising, a control member having a first position and movable toward an actuated position, a thermoelectric generator, a motor in circuit with said generator capable of continuous operation on the power supplied by said generator when subjected to less than a predetermined load, said motor being adapted to stall when subjected to a load greater than said predetermined load, force transmitting connection means between said motor and control member operable to effect actuation of said control member to said actuated position by operation of said motor under less than said predetermined load and to impose more than said predetermined load on said motor to stall the latter when said control member is in said actuated position, said motor on continued energization being operable to hold said control member in said actuated position, and on deenergization permitting return of said control member to its first position, and condition responsive circuit-controlling means having low resistance contacts in said circuit for controlling energization of said motor and hence the position of said control member in accordance with the condition.

18. Control apparatus comprising, a control member having a first position and movable toward an actuated position, a thermoelectric generator, a motor comprising fluid pumping means in circuit with said generator capable of continuous operation on the power supplied by said generator when subjected to less than a predetermined load, said motor being adapted to stall when subjected to a load greater than said predetermined load, and force transmitting connection means between said motor and control member comprising fluid pressure operated means fluidly connected to said pumping means and operable to effect actuation of said control member to said actuated position by operation of said motor under less than said predetermined load and to impose more than said predetermined load on said motor to stall the latter when said control member is in said actuated position, said motor on continued energization being operable to hold said control member in said actuated position, and on deenergization permitting return of said control member to its first position.

19. Control apparatus comprising, a control member having a first position and movable toward an actuated position, a thermoelectric generator, a motor comprising fluid pumping means in circuit with said generator capable of continuous operation on the power supplied by said generator when subjected to less than a predetermined load, said motor being adapted to stall when subjected to a load greater than said predetermined load, force transmitting connection means between said motor and control member comprising fluid pressure operated means fluidly connected to said pumping means and operable to effect actuation of said control member to said actuated position by operation of said motor under less than said predetermined load and to impose more than said predetermined load on said motor to stall the latter when said control member is in said actuated position, said motor on continued energization being operable to hold said control member in said actuated position, and on deenergization permitting return of said control member to its first position, and condition responsive circuit-controlling means having low resistance contacts in said circuit for controlling energization of said motor and hence the position of said control member in accordance with the condition.

20. Control apparatus comprising, a control member movable to controlling positions, a step by step electromagnetic operator, a source of electric energy connected in circuit with said operator for energizing the latter, said operator having an armature oscillatable between a first retracted position and an attracted position on energization of said operator, a movable intermediate member operatively connected to said control member and biased in one direction, ratchet means operatively associated with said armature and intermediate member for actuating said intermediate member in a direction for effecting controlling movement of said control member by oscillatory movement of said armature, said ratchet means retaining said intermediate member in an actuated position when moved thereto, said armature being movable to a second retracted position on deenergization of said operator, and release means operatively associated with said armature and ratchet means and responsive to movement of said armature to said second retracted position for effecting release of said intermediate member from said ratchet means and return movement thereof under its bias.

21. Control apparatus comprising, a control member movable to controlling positions, a step by step electromagnetic operator, a source of electric energy connected in circuit with said operator for energizing the latter, said operator having an armature oscillatable between a first retracted position and an attracted position on energization of said operator, an operative connection between said armature and control member comprising energy storing means in which energy is stored by said oscillatory movement of said armature for use in actuating said control member when a predetermined amount of energy has been stored therein, said armature being movable to a second retracted position on deenergization of said operator, and release means operatively associated with said armature and operative connection and responsive to movement of said armature to said second retracted position for effecting release of the energy stored in said connection for return of said control member to its initial position.

22. Control apparatus comprising, a control member movable to controlling positions, a step by step electromagnetic operator, a source of electric energy connected in circuit with said operator for energizing the latter, said operator having an armature oscillatable between a first retracted position and an attracted position on energization of said operator, an operative connection between said armature and control member comprising energy storing ratchet means in which energy is stored by said oscillatory movement of said armature for use in actuating said control member when a predetermined amount of energy has been stored therein, said armature being movable to a second retracted position on deenergization of said operator, and release means operatively associated with said armature and operative connection and responsive to movement of said armature to said second retracted position for effecting release of the energy stored in said connection for return of said control member to its initial position.

23. Control apparatus comprising, a control member movable to controlling positions, a step by step electromagnetic operator, a source of electric energy connected in circuit with said operator for energizing the latter, said operator having an armature oscillatable between a first retracted position and an attracted position on energization of said operator, an operative connection between said armature and control member comprising energy storing fluid pumping means in which energy is stored by said oscillatory movement of said armature for use in actuating said control member when a predetermined amount of energy has been stored therein, said armature being movable to a second retracted position on deenergization of said operator, and release means operatively associated with said armature and operative connection and responsive to movement of said armature to said second retracted position for effecting release of the energy stored in said connection for return of said control member to its initial position.

References Cited in the file of this patent
UNITED STATES PATENTS

| | | |
|---|---|---|
| Re. 21,968 | Ackerman | Dec. 9, 1941 |
| 1,013,494 | Hutches | Jan. 2, 1912 |
| 1,381,514 | Soper | June 14, 1921 |
| 1,737,649 | Edsall | Dec. 3, 1929 |
| 2,052,929 | Kronmiller | Sept. 1, 1936 |
| 2,276,195 | Holmes | Mar. 10, 1942 |